United States Patent
Wooh

(10) Patent No.: US 11,779,873 B2
(45) Date of Patent: Oct. 10, 2023

(54) DUST COLLECTION FILTER TARGET-COATED WITH LIQUID FILM

(71) Applicant: Chungang University Industry Academic Cooperation Foundation, Seoul (KR)

(72) Inventor: Sanghyuk Wooh, Seoul (KR)

(73) Assignee: Chungang University Industry Academic Cooperation Foundation, Seoul (KR)

( * ) Notice: Subject to any disclaimer, the term of this patent is extended or adjusted under 35 U.S.C. 154(b) by 529 days.

(21) Appl. No.: 16/962,320

(22) PCT Filed: Aug. 31, 2018

(86) PCT No.: PCT/KR2018/010183
§ 371 (c)(1),
(2) Date: Jul. 15, 2020

(87) PCT Pub. No.: WO2019/142994
PCT Pub. Date: Jul. 25, 2019

(65) Prior Publication Data
US 2020/0338484 A1    Oct. 29, 2020

(30) Foreign Application Priority Data

Jan. 17, 2018 (KR) .................. 10-2018-0005 810
May 21, 2018 (KR) .................. 10-2018-0057716

(51) Int. Cl.
*B01D 47/00* (2006.01)
*B01D 46/00* (2022.01)
(Continued)

(52) U.S. Cl.
CPC ......... *B01D 47/00* (2013.01); *B01D 39/1607* (2013.01); *B01D 46/0001* (2013.01);
(Continued)

(58) Field of Classification Search
CPC .................. B01D 39/1607; B01D 2247/00; B01D 45/10; B01D 46/0001; B01D 46/40;
(Continued)

(56) References Cited

U.S. PATENT DOCUMENTS

| 6,336,947 B1 * | 1/2002 | Atsumi | ............ B01D 46/0001 |
| | | | 55/486 |
| 2016/0186334 A1 * | 6/2016 | Murahara | ............ H01G 9/035 |
| | | | 429/188 |

FOREIGN PATENT DOCUMENTS

| JP | 2006-231236 A | 9/2006 |
| JP | 2007-508928 A | 4/2007 |

(Continued)

OTHER PUBLICATIONS

O'Lenick. (2010). Comparatively Speaking: Lowering Surface Tension in Water vs. Oil. Cosmetics & Toiletries. https://www.cosmeticsandtoiletries.com/research/methods-tools/article/21834581/comparatively-speaking-lowering-surface-tension-in-water-vs-oil (Year: 2010).*

(Continued)

*Primary Examiner* — Gabriel E Gitman
(74) *Attorney, Agent, or Firm* — NSIP Law

(57) ABSTRACT

Disclosed is a particulate matter (PM) capturing and collecting filter device having a target-coated liquid film. More specifically, disclosed is a PM particle capturing and collecting filter device having a target-coated liquid film in which a spreading phenomenon in which a liquid material spreads outside the filter is suppressed. Disclosed is a filter device for capturing and collecting PM particles, in which a liquid film having interface energy control and capillary force induction is used for effective PM particle capturing and collecting, and a surrounding portion is formed for preventing spreading of a liquid material on a substrate.

18 Claims, 8 Drawing Sheets

(51) Int. Cl.
  *B01D 39/16* (2006.01)
  *B01D 46/40* (2006.01)
(52) U.S. Cl.
  CPC .......... *B01D 46/40* (2013.01); *B01D 2239/02* (2013.01); *B01D 2239/0428* (2013.01); *B01D 2239/065* (2013.01); *B01D 2247/00* (2013.01)
(58) Field of Classification Search
  CPC ................ B01D 47/00; B01D 2239/02; B01D 2239/0428; B01D 2239/065; B01D 2239/0478; B01D 39/10; B01D 39/18; B01D 39/1623; B01D 39/2003; B01D 39/2027; B01D 39/2068
  See application file for complete search history.

(56) References Cited

FOREIGN PATENT DOCUMENTS

| | | |
|---|---|---|
| JP | 2011-183331 | 9/2011 |
| JP | 2011-183331 A | 9/2011 |
| KR | 10-2014-0111338 A | 9/2014 |
| KR | 10-2017-0029242 | 3/2017 |
| KR | 10-1791677 | 10/2017 |
| KR | 10-1791677 B1 | 10/2017 |
| KR | 10-1808115 B1 | 12/2017 |
| WO | WO 99/61130 A1 | 12/1999 |
| WO | WO 2014/144536 A1 | 9/2014 |

OTHER PUBLICATIONS

International Search Report dated Dec. 10, 2018 in corresponding International Patent Application No. PCT/KR2018/010183 (3 pages in English, 3 pages in Korean).

Korean Office Action dated Apr. 9, 2019 in corresponding Korean Patent Application No. 10-2018-0005810 (5 pages in Korean).

Korean Office action issued by the KIPO dated Jan. 10, 2020 for the counterpart of Korean Patent Application No. 10-2018-0057716. (6 pages in Korean).

* cited by examiner

DUST COLLECTION FILTER TARGET-COATED WITH LIQUID FILM

CROSS REFERENCE TO RELATED APPLICATIONS

This application is a U.S. National Stage Application of International Application No. PCT/KR2018/010183, filed on Aug. 31, 2018, which claims the benefit under 35 USC 119(a) and 365(b) of Korean Patent Application Nos. 10-2018-0005810, filed on Jan. 17, 2018, and 10-2018-0057716, filed on May 21, 2018, in the Korean Intellectual Property Office, the entire disclosure of which is incorporated herein by reference for all purposes.

FIELD

The present disclosure relates to a particulate matter (PM) such as dust capturing and collecting filter device, specifically to a PM particle capturing and collecting filter device having a target-coated liquid film.

The present disclosure relates to use of a liquid film coated filter for capturing and collecting PM particles. More specifically, the present disclosure relates to efficient use of the liquid film coated filter in which a spreading phenomenon in which a liquid material spreads outside the filter is suppressed.

DESCRIPTION OF RELATED ART

A solid in contact with a liquid exhibits significantly stronger adsorption than in solid-solid adsorption based on van der Waals forces. However, since the liquid always flows down by external forces, such as gravity and wind, and thus may not have a stationary phase, there have been many problems and limitations in using the liquid on a filter.

In order to solve these problems, a liquid layer is coated on a filter surface, and a fixed liquid film based on a capillary force and low interface energy with a substrate surface is formed on the filter surface, which does not cause flow of liquid film by external forces. A material constituting the liquid film on the surface is generally a liquid with a low surface tension such that PM particles are effectively captured on the liquid film based on strong adsorption between liquid and solid. Further, strong adsorption between liquid and solid is used rather than a scheme in which small pores are formed as in a solid filter to filter PM particle smaller than the pores. Thus, the liquid coated filter can capture PM particles with a size of 10 microns or smaller that may not be captured, without pressure drop.

As described above, the 'liquid film-coated filter' has a superior versatility because it may be used in a fixed manner while exhibiting superior adsorption characteristics, compared to a conventional solid filter. However, in order to utilize the filter coated with the liquid film more effectively, a spreading problem in which the liquid material spreads out when fixing the filter must be solved.

In such a filter, a fixed thin film in which the liquid material does not flow downwards by gravity may be realized using a method of minimizing an interfacial energy between the substrate and the liquid material. Thus, the liquid material may be stably present on the filter surface. However, due to the low surface tension, the liquid material spreads as wide as possible on the solid surface to increase an interface area. When the liquid material does not exist only in the filter but spreads to components or parts of an apparatus outside the filter, this may cause not only loss of the liquid material but also damage to the components or parts.

In order to effectively use the filter coated with the liquid material, a target coating technology is essential in which the liquid material is coated on only on a target region on the substrate surface for capturing and collecting PM particle and does not spread out of the target region.

DISCLOSURE

Technical Purposes

A purpose of the present disclosure is to provide a filter for capturing and collecting PM particles, in which a liquid film having interface energy control and capillary force induction is used for effective PM particles capturing and collecting. A purpose of the present disclosure is to provide a filter for capturing and collecting PM particles, the filter having a surrounding portion for preventing spreading of a liquid material on a substrate.

Technical Solutions

One aspect of the present disclosure provides a PM particle capturing and collecting filter device having a target-coated liquid film, the device comprising: a substrate; a surface modifying layer formed on the substrate; and a liquid layer coated on the substrate while the surface modifying layer is impregnated with the liquid layer.

In one embodiment, the substrate is a porous substrate.

In one embodiment, the surface modifying layer is made of a material having a surface energy of 40 mN/m or lower.

In one embodiment, the liquid layer is made of a hydrophobic liquid material having low surface energy. In one embodiment, the liquid material has a surface energy of 40 mN/m or lower.

In one embodiment, a difference between a surface energy of the liquid layer and a surface energy of the surface modifying layer is 10 mN/m or lower. In one embodiment, a difference between a surface energy of the liquid layer and a surface energy of the surface modifying layer is 5 mN/m or lower.

In one embodiment, the device further comprises a surrounding portion coated on the substrate and surrounding the liquid layer. In one embodiment, the surrounding portion is made of a material having a surface energy lower than a surface energy of the liquid layer.

In one embodiment, the surrounding portion is made of a material having a surface energy of 20 mN/m or lower.

In one embodiment, the device further comprise a holder disposed to surround at least a portion of an outer periphery of the liquid layer. In one embodiment, the holder or a coating thereon is made of a material having a surface energy lower than a surface energy of the liquid layer.

In one embodiment, the holder or the coating thereon is made of a material having a surface energy of 20 mN/m or lower.

In one embodiment, the holder has a tongs shape that contacts a bottom surface of the substrate and a top surface of the liquid film to support a combination of the substrate and the liquid layer impregnated into the surface modifying layer.

In one embodiment, the substrate is a porous substrate having a fabric, mesh, non-woven fabric, or metal mesh structure. In one embodiment, the device includes a stack of combinations, each combination being composed of the substrate and the liquid layer impregnated into the surface modifying layer.

In one embodiment, each combination further includes a surrounding portion coated on the substrate and surrounding the liquid layer.

One aspect of the present disclosure provides a method for manufacturing a PM particle capturing and collecting filter device having a target-coated liquid film, the method comprising: preparing a substrate; forming a surface modifying layer on the substrate; forming a surrounding portion on the substrate to surround the surface modifying; and coating a liquid layer on the surface modifying layer such that the surface modifying layer is impregnated with the liquid layer, wherein a difference between a surface energy of the liquid layer and a surface energy of the surface modifying layer is 10 mN/m or lower, and the surrounding portion is made of a material having a surface energy lower than a surface energy of the surface modifying layer, such that the liquid layer is coated only on a region of the surface modifying layer while the surrounding portion prevents the liquid layer from spreading out of the region of the surface modifying layer.

Technical Effects

The filter according to the present disclosure unlike a conventional dry solid filter allows PM particle of all sizes to be collected more effectively per unit volume, and requires no driving energy and is able to be manufactured at a low cost and is installed in various forms and in various spaces such as a PM particle generating site of a factory, a thermal power plant chimney, a building, a road, a vacuum cleaner, and an air cleaner.

The filter coated with the liquid film according to the present disclosure suppresses the spreading phenomenon that the liquid material spreads out of the filter when using the filter coated with the liquid film, thereby to reduce loss of the liquid material to prevent the damage to the components outside the filter. Thus, this spreading phenomenon suppressing function is expected to play a key role in applying the liquid film coated filter to a PM particle capturing and collecting filter device for various industrial/home use.

Figure 1A:
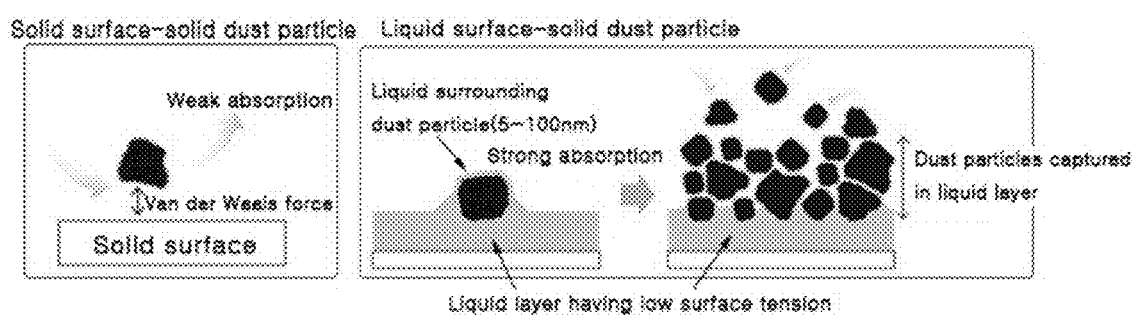
FIG. 1A shows a schematic diagram of a state in which PM particles are adsorbed on solid and liquid surfaces.

Various embodiments are now described with reference to the drawings. Like reference numerals are used throughout the drawings to indicate similar elements. Specific details are presented herein to provide an understanding of the present disclosure. However, it is apparent that the embodiments may be practiced without these specific details. In other instances, well-known structures and devices are presented in block diagram forms in order to facilitate describing the embodiments.

DETAILED DESCRIPTIONS

Hereinafter, embodiments of the present disclosure will be described in detail with reference to the accompanying drawings. The present disclosure may be variously modified and may have various forms, and specific embodiments will be illustrated in the drawings and described in detail herein. However, the specific embodiments are not intended to limit the present disclosure thereto. It should be understood that all modifications, equivalents, or substitutes thereto are included in the scope and spirit of the present disclosure. In describing the drawings, similar reference numerals are used for similar components.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises", "comprising", "includes", and "including" when used in this specification, specify the presence of the stated features, integers, operations, elements, and/or components, but do not preclude the presence or addition of one or more other features, integers, operations, elements, components, and/or portions thereof.

The present disclosure intends to provide a filter for capturing and collecting PM particles, in which a liquid film having interface energy control and capillary force induction is used for effective PM particle capturing and collecting, and a surrounding portion is formed for preventing spreading of a liquid material on a substrate.

Unlike a conventional HEPA-based solid filter, a filter according to the present disclosure has a liquid surface to very effectively adsorb PM particles therein based on strong adsorption between liquid and solid as shown in FIG. 1A. A liquid flows down to a low position due to gravity, and thus may not be present in a stationary phase. Thus, there is a limitation in applying strong adsorption between liquid and solid to a filter of a stationary phase such as a solid filter. Therefore, a main feature of the present disclosure is to minimize an interfacial energy between a solid substrate surface and a liquid layer of the filter and induce a capillary force to implement a liquid film that does not flow or fall down by gravity on or from a filter surface.

Based on the strong adsorption between the liquid film and the PM particles, a liquid film coated filter according to the present disclosure exhibits more reliable PM particle capturing and collecting effect than that in a conventional dry filter introduced in a prior art. Unlike a conventional wet capturing and collecting scheme, the liquid film coated filter according to the present disclosure, a liquid material is present in a stationary phase to capture PM particles in various environments to ensure application versatility of the filter.

Hereinafter, a PM particle capturing and collecting filter device according to the present disclosure will be described.

Figure 1B:
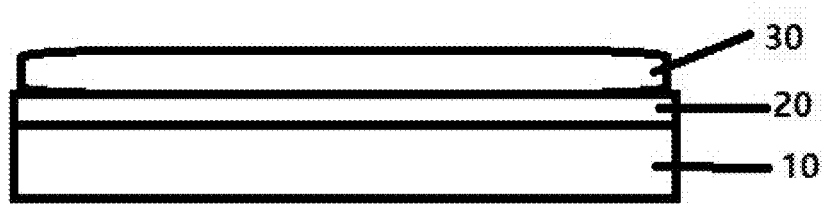
FIG. 1B shows a simplified cross-sectional view of a PM particle capturing and collecting filter device according to one embodiment of the present disclosure.

FIG. 1B shows a simplified cross-sectional view of a PM particle capturing and collecting filter device according to one embodiment of the present disclosure. As shown in FIG. 1B, the PM particle capturing and collecting filter device according to one embodiment of the present disclosure includes a substrate 10; a surface modifying layer 20 formed on the substrate; and a liquid layer 30.

The substrate 10 may be made of at least one of metal, polymer, fiber, glass, ceramic, and paper (cellulose). Further, the substrate may have a mesh structure. Although FIG. 1B shows the substrate in a form of a flat plate, the substrate may be in a form of a fiber or a mesh to increase a surface area thereof. The substrate with the large surface area enables more effective PM particle capturing and collecting.

The substrate 10 is preferably a porous substrate in which a capillary force is induced between the substrate and the liquid layer such that the liquid layer maintains a fixed phase even when an external pressure such as gravity is applied thereto. The liquid layer that does not flow down by gravity due to low interface energy as will be described below and the capillary force is realized.

Next, the surface modifying layer 20 is formed on the substrate. The surface modifying layer is made of preferably a material having a low surface energy. Numerically, the material has a surface energy of 40 mN/m or lower.

The surface modifying layer 20 as shown in FIG. 1B is formed on one face of the substrate. However, the present disclosure is not limited thereto. When the substrate has a fiber or mesh structure, the surface modifying layer 20 surrounds all of strands of the mesh or the fiber.

A material for the surface modifying layer 20 may include a surface modifying polymer having low surface energy. For example, a material for the surface modifying layer 20 may include hydrocarbon-based or fluorocarbon-based monomer or polymer. For example, a material for the surface modifying layer 20 may include polysilicone.

The liquid layer 30 is coated on the substrate while the surface modifying layer 20 is impregnated with the liquid layer 30. In the present specification, the liquid layer is also referred to as the liquid film. The liquid layer is made of preferably a hydrophobic material that has low surface energy and does not mix with water. Specifically, it is preferable that a material having a surface energy of 40 mN/m or lower is used as the material of the liquid layer 30.

When the hydrophobic material is used as the material of the liquid layer, the PM particle attached to the liquid layer may be removed by spraying water droplets thereto. In addition, a material having a surface energy lower than a surface energy of 72 mN/m should be used as the material of the liquid layer 30.

It is preferable that the liquid layer 30 and the surface modifying layer 20 are made of a chemically identical material. In addition, a difference between surface energies of the liquid layer 30 and the surface modifying layer 20 is preferably 10 mN/m or lower, more preferably 5 mN/m or lower.

For example, the liquid material for the layer 30 may include a material capable of minimizing interfacial energy based on the surface modifying material on the substrate. For example, when the substrate surface is modified with fluorocarbon molecules, a fluorocarbon-based lubricant may be used as the liquid material for the layer 30. When modifying the substrate surface with hydrocarbon molecules, a hydrocarbon-based lubricant may be used as the liquid material for the layer 30. This may minimize the interfacial energy between the substrate surface and the liquid layer 30. Especially, when the substrate surface is modified with polysilicone, and silicone oil is used as the liquid material for the layer 30, a silicone oil liquid film which is very stably maintained on the substrate may be realized. This is because the polysilicone and the silicone oil are chemically identical with each other, and thus have very low interfacial energy difference therebetween close to 0 mN/m, and the polysilicone layer is stably impregnated with the silicone oil.

The liquid layer 30 is coated on the substrate preferably using a spraying or immersing method.

Figure 1C:
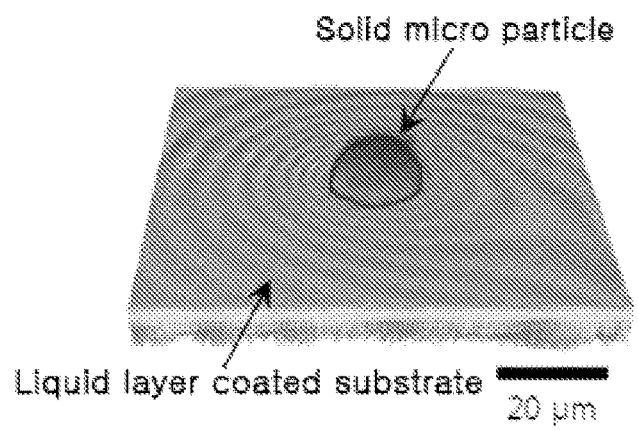
FIG. 1C shows 3D confocal microscope based analysis of micro PM particles adsorbed in a liquid film coated on a substrate.

The liquid layer (liquid film) coated on the substrate strongly adsorbs PM particles thereon based on a strong adsorption force between liquid and solid as shown in FIG. 1C. FIG. 1C shows 3D confocal microscope based analysis of micro PM particle adsorbed in a liquid film coated on a substrate. Therefore, the PM particle capturing and collecting filter device according to the present disclosure may not use a method of filtering the PM particles using pores smaller than fine PM particles as in a conventional solid filter, but may adsorb PM particles on the liquid surface. The strong adsorption force acts on the PM particles regardless of a size thereof, such that PM particles of 10 micrometers or smaller may be captured very effectively.

Figure 1D:
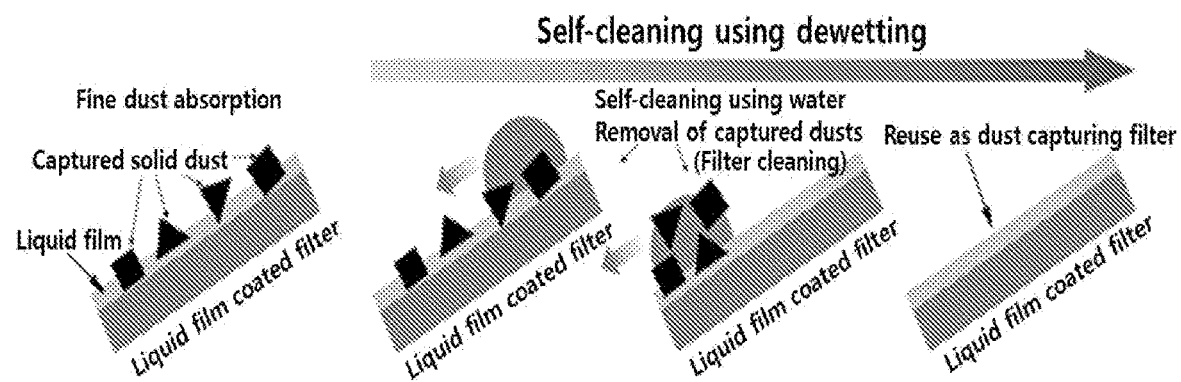
FIG. 1D shows a self-cleaning process using droplet spray to remove PM particles captured in a liquid film coated on a substrate.
Figure 3:
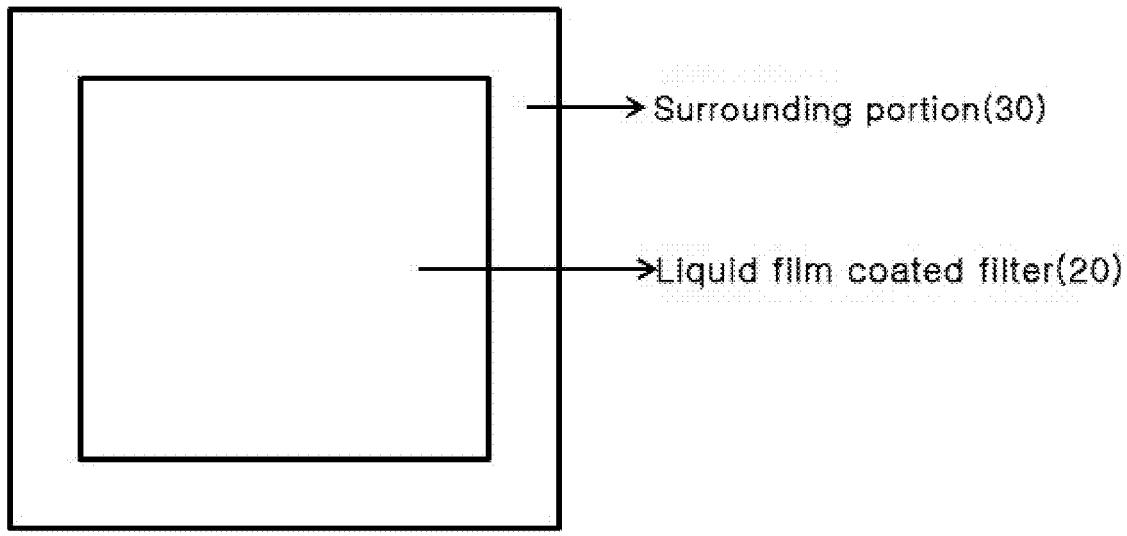
FIG. 3 shows a top view of a PM particle capturing and collecting filter device with a target-coated liquid film according to one embodiment of the present disclosure.

Further, in order to use the filter continuously and for a long time, it is necessary to remove the captured PM particle therefrom simply and effectively. According the present disclosure, the substrate surface is modified with the material having low surface energy and the liquid material with low surface tension is used to realize the stable liquid film that does not flow under gravity. In this connection, the liquid layer having the low surface tension coated on the substrate surface having such low surface energy has an exceptionally good self-cleaning effect. Therefore, as shown in FIG. 3, water droplets flow on the filter to capture the PM particle thereon, such that the water droplets sweep and remove the captured fine PM particles due to the self-cleaning effect. Thus, a clean filter surface may be obtained to enable continuous reuse of the filter. FIG. 1D shows a self-cleaning process using droplet spray to remove PM particles captured on the liquid film coated on the substrate.

In one example, the liquid material with the low surface tension tends to spread over a solid surface with a high surface energy to change to a lower energy state in terms of thermodynamics. Therefore, in accordance with the present disclosure, a PM particle capturing and collecting region of the substrate surface in which a PM particle capturing and collecting function is activated has a surface energy similar to that of the liquid material, and a surrounding region of the substrate surface around the PM particle capturing and collecting region has a surface energy lower than the surface tension of the liquid material. Thus, the spreading of the liquid material may be suppressed.

When the liquid material is coated on the substrate surface as configured above, the liquid film is stably implemented on the PM particle capturing and collecting region, while dewetting occurs on the surrounding region of the substrate surface around the PM particle capturing and collecting region and thus the coating is not formed thereon. In this way, a target coating is achieved. Therefore, the surrounding region of the substrate surface is modified with the material having low surface energy. Alternatively, a surface of a frame acting as a holder of the filter is modified with a material having low surface energy. Thus, the spreading of the liquid material out of the frame may be suppressed. Thus, the problem that the liquid material spreads out of the filter to cause the damage to components of an external apparatus may be effectively solved.

Figure 1E:
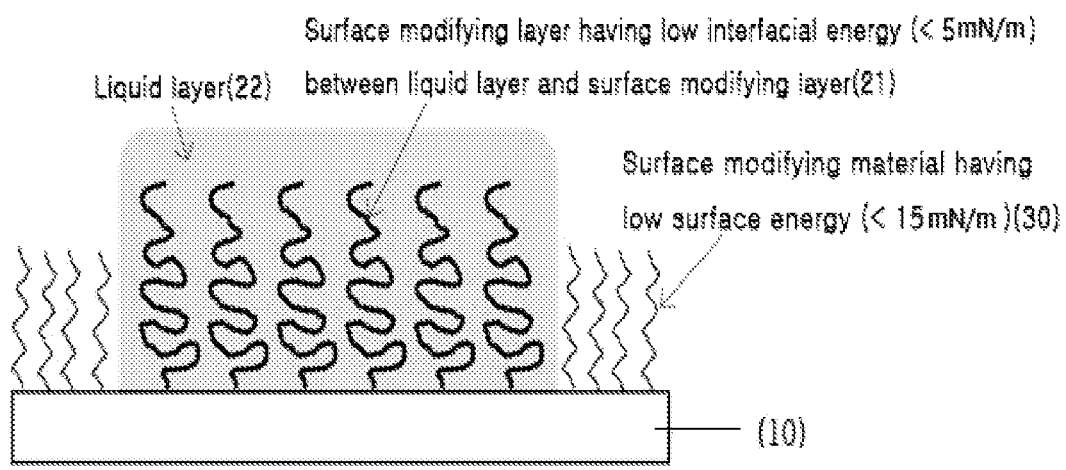
FIG. 1E shows a schematic diagram of a PM particle capturing and collecting filter device with a target-coated liquid film according to one embodiment of the present disclosure.
Figure 2:
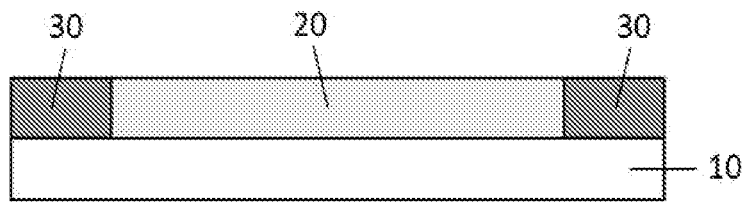
FIG. 2 shows a cross-sectional side view of a PM particle capturing and collecting filter device with a target-coated liquid film according to one embodiment of the present disclosure.

FIG. 1E shows a schematic diagram of a PM particle capturing and collecting filter device with a target-coated liquid film according to one embodiment of the present disclosure. FIG. 2 shows a cross-sectional side view of a PM particle capturing and collecting filter device with a target-coated liquid film according to one embodiment of the present disclosure. FIG. 3 shows a top view of a PM particle capturing and collecting filter device with a target-coated liquid film according to one embodiment of the present disclosure.

A PM particle capturing and collecting filter device having a target-coated liquid film according to an additional embodiment of the present disclosure includes a substrate 10; a surface modifying layer 21 formed on the substrate; a liquid layer 22 coated on the substrate 10 while the surface modifying layer 21 is impregnated with the liquid layer 22; and a surrounding portion 30 surrounding an outer periphery of the liquid layer. The additional embodiment is the same as the above embodiment except that the surrounding portion 30 is included in the additional embodiment. Thus, redundant descriptions therebetween will be omitted.

The liquid film 20 includes the surface modifying layer 21 and the liquid layer 22 in FIG. 1E, and is indicated by a reference numeral 20 in FIG. 2. This liquid film captures PM particles.

The substrate 10 may be made of at least one of metal, polymer, fiber, glass, ceramic, and paper (cellulose). Further, the substrate may have a mesh structure. The substrate 10 is preferably a porous substrate in which a capillary force is induced between the substrate and the liquid layer such that the liquid layer maintains a fixed phase even when an external pressure such as gravity is applied thereto. The liquid layer that does not flow down by gravity due to low interface energy as will be described below and the capillary force is realized.

Next, the surface modifying layer 21 is formed on the substrate. The surface modifying layer 21 is made of preferably a material having a low surface energy. Numerically, the material has a surface energy of 40 mN/m or lower.

A material for the surface modifying layer 21 may include a surface modifying polymer having low surface energy. For example, a material for the surface modifying layer 21 may include hydrocarbon-based or fluorocarbon-based monomer or polymer. For example, a material for the surface modifying layer 20 may include polysilicone.

The liquid layer 22 is coated on the substrate while the surface modifying layer 21 is impregnated with the liquid layer 22. In the present specification, the liquid layer is also referred to as the liquid film including the surface modifying layer 21. The liquid layer 22 is made of preferably a hydrophobic material that has low surface energy and does not mix with water. Specifically, it is preferable that a material having a surface energy of 40 mN/m or lower is used as the material of the liquid layer 22.

When the hydrophobic material is used as the material of the liquid layer, the PM particle attached to the liquid layer may be removed by spraying water droplets thereto. In addition, a material having a surface energy lower than a surface energy of 72 mN/m should be used as the material of the liquid layer 22.

It is preferable that the liquid layer 22 and the surface modifying layer 21 are made of a chemically identical material. In addition, a difference between surface energies of the liquid layer 22 and the surface modifying layer 21 is preferably 10 mN/m or lower, more preferably 5 mN/m or lower.

The liquid layer 22 is coated on the substrate 10 preferably using a spraying or immersing method.

In one example, the filter according to the present disclosure includes the surrounding portion 30 surrounding the liquid layer 22. The surrounding portion 30 is made of a material having a lower surface energy than that of the liquid layer 22. It is preferable that the liquid layer is made of a material with a surface energy of 40 mN/m or lower, and a material having a surface energy of 20 mN/m or lower is used for the surrounding portion.

The surrounding portion 30 prevents the spreading of the liquid material in the liquid layer across the substrate. Therefore, a target coating is performed so that the liquid film is selectively coated only on a target region for capturing and collecting PM particles.

When the surface energy of the solid is high, the liquid spreads on the solid surface to form the largest interface to lower energy of the entire system thermodynamically. However, when the surface energy of the solid is sufficiently low, and when the liquid forms an interface with the solid, energy of the entire system increases thermodynamically. Thus, the liquid minimizes a contact area with the solid surface and thus and does not spread on the surface having the low surface energy. According to the present disclosure, the spreading of the liquid film does not proceed to the surrounding portion whose the surface is modified with the material having the low surface energy. Therefore, the edge portion (surrounding portion) having the low surface energy in accordance with the present disclosure allows a target coating function by which the liquid material spreading phenomenon to the outside of the target region is suppressed and the liquid film is selectively coated only on the target region for capturing and collecting PM particles as a filter.

In an embodiment of the PM particle capturing and collecting filter device having the target-coated liquid film according to the present disclosure, hydrocarbon-based liquid or silicone oil (20 mN/m<surface tension <30 mN/m) is used as the liquid material for the liquid layer 22. Thus, the surface of the target region is modified with a hydrocarbon-based monomer, polymer, or silicon polymer. Thus, the interfacial energy between the liquid layer and the substrate surface is minimized (the interfacial energy of 5 mN/m or lower) such that a stable liquid coating is formed. In a surrounding region around the target region, the surface of the substrate is modified with fluorocarbon-based molecule having a low surface energy of 30 mN/m or lower. Thus, in the surrounding region around the target region, dewetting occurs such that the liquid material is not coated on the surface of such a low surface energy and does not spread out of the target region as a filtering region.

Figure 4:
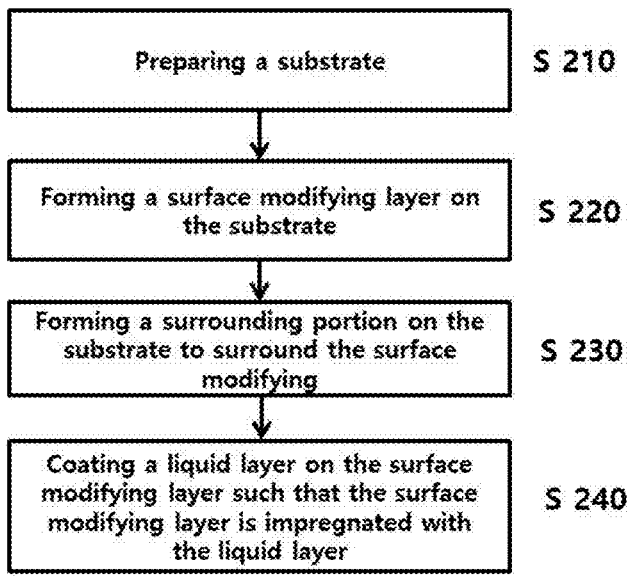
FIG. 4 shows a flowchart of a method for manufacturing a PM particle capturing and collecting filter device with a target-coated liquid film according to the present disclosure.

A method of manufacturing a PM particle capturing and collecting filter device with a target-coated liquid film according to the present disclosure is shown in a flowchart of FIG. 4.

As shown in the flowchart of FIG. 4, the manufacturing method of the PM particle capturing and collecting filter device having the target-coated liquid film according to the present disclosure includes a step S 210 of preparing the substrate; a step S 220 of forming the surface modifying layer on the substrate; a step S 230 of forming the surrounding portion on the substrate to surround the surface modifying layer; and a step S 240 of coating the liquid layer on the substrate such that the surface modifying layer is impregnated with the liquid layer.

The substrate is provided and the surface modifying layer is formed on the substrate. The surrounding portion is formed on the substrate to surround an outer periphery of the surface modifying layer. In this connection, the surface modifying layer is made of a material such that a difference between the surface energy of the material of the surface modifying layer and the surface energy of the liquid layer is 10 mN/m or lower. The material having a lower surface energy than that of the surface modifying layer is used for the surrounding portion. When the liquid layer is coated on the surface modifying layer such that the surface modifying layer is impregnated with the liquid layer. In this connection, the liquid layer is formed only on the surface modifying layer while the surrounding portion prevents the liquid layer from spreading of the target region, so that the liquid film may be target-coated.

According to the present disclosure, the surface of the target region of the substrate in which the liquid layer is be formed is modified with the material having a surface energy similar to that of the liquid material for the liquid layer, and the surface of the edge of the filter, that is, the surrounding region around the target region is modified with the material having a lower surface energy than that of the liquid material, thereby to prevent the liquid material from spreading out of the target region. Thus, the liquid layer is maintained stably on the target region.

Figure 5:
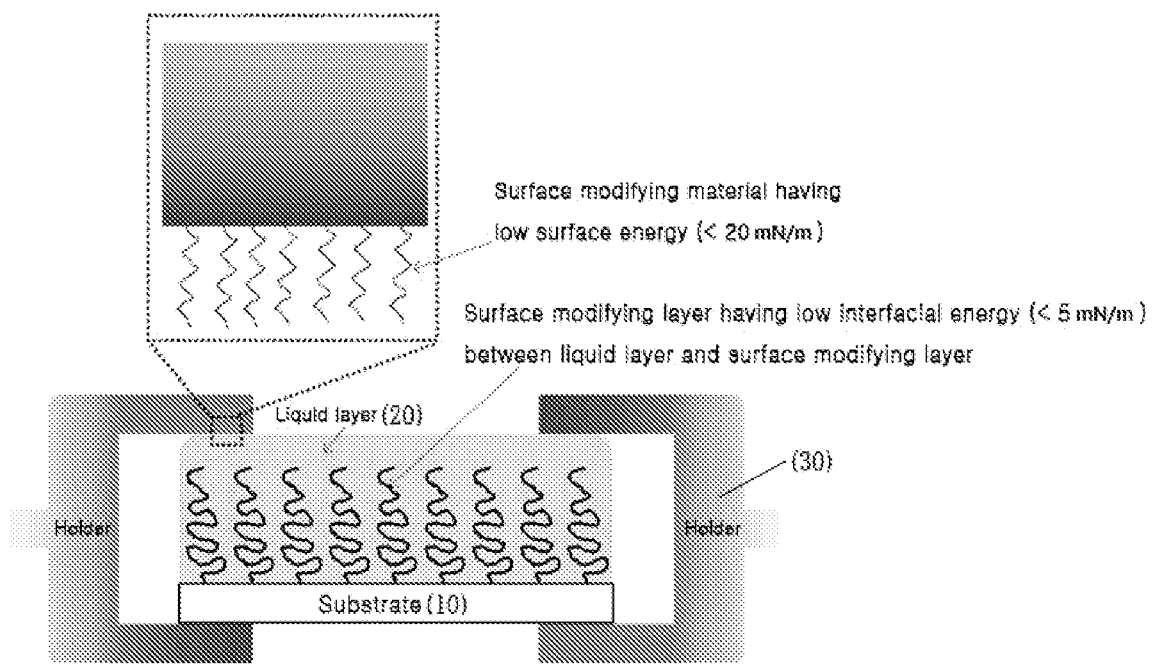
FIG. 5 shows a schematic side elevation view of a PM particle capturing and collecting filter device with a target-coated liquid film according to an additional embodiment of the present disclosure.
Figure 6:
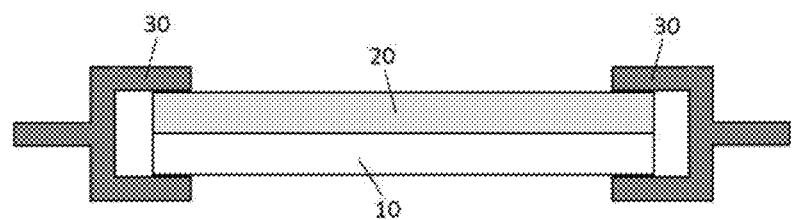
FIG. 6 shows a cross-sectional side view of a PM particle capturing and collecting filter device with a target-coated liquid film according to an additional embodiment of the present disclosure.

In the embodiment of FIG. 1E to FIG. 4, the surrounding region around the target region is modified with the material having a lower surface energy than that of the liquid material, thereby to prevent the liquid material from spreading out of the target region. In one example, not the coated portion but a holder may act as a surrounding portion, as illustrated in FIG. 5 to FIG. 6. Hereinafter, an additional embodiment using the holder will be further described. Repetitive descriptions of the same components between the above embodiments and the additional embodiment will be omitted.

FIG. 5 shows a schematic side elevation view of a PM particle capturing and collecting filter device with a target-coated liquid film according to an additional embodiment of the present disclosure. FIG. 6 shows a cross-sectional side view of a PM particle capturing and collecting filter device with a target-coated liquid film according to an additional embodiment of the present disclosure.

As shown in FIG. 5 to FIG. 6, a PM particle capturing and collecting filter device having a target-coated liquid film according to a further embodiment of the present disclosure includes the substrate 10; the surface modifying layer 21 formed on the substrate; the liquid layer 22 coated on the substrate while the surface modifying layer 20 is impregnated with the liquid layer; and a holder 30 disposed to surround the liquid layer 22.

In the embodiment of FIG. 5 to FIG. 6, unlike the embodiments of FIG. 1 to FIG. 4, the surrounding portion made of the material having a low surface energy and surrounding the liquid film is not additionally coated. The holder acts as the surrounding portion.

When a surface of the frame that acts as a holder of the filter is modified to a material with a low surface energy, the liquid film may no longer spread out of the holder, and thus may be maintained on the target region, that is, the filtering region.

As shown in FIG. 5, the holder is in a form of tongs that support the PM particle capturing and collecting filter device while being in contact with a bottom face of the substrate and a top face of the liquid film. A surface of the frame that acts as a holder of the filter is modified to a material with a low surface energy, thereby to prevent the liquid material from spreading out of the holder. It is preferable that a material having a surface energy of 20 mN/m or lower is coated on the holder.

In a further embodiment, the substrate is preferably a porous substrate.

The surface modifying layer is made of a material having a surface energy of 40 mN/m or lower. The liquid layer is made of a material having a low surface energy and being hydrophobic. The liquid layer may be made of a material having a surface energy of 40 mN/m or lower.

Further, a difference between the surface energy of the liquid layer and the surface energy of the surface modifying layer is preferably 10 mN/m or lower, preferably 5 mN/m or lower.

Figure 7:
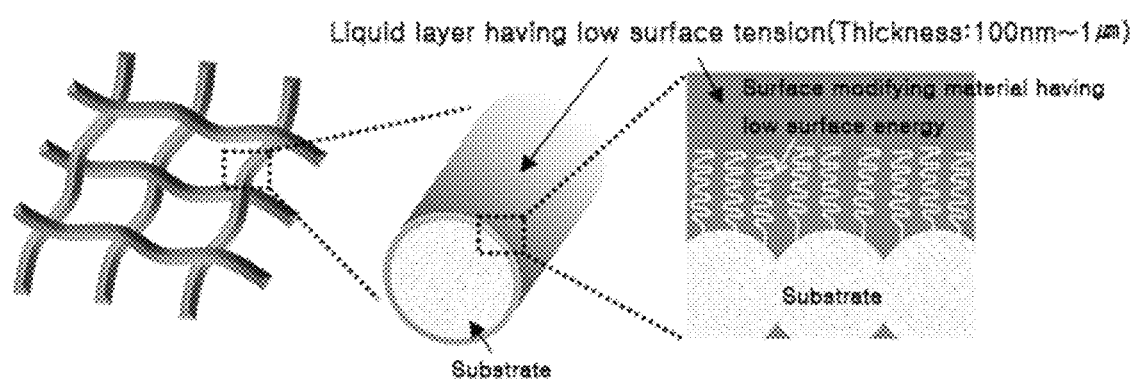
FIG. 7 shows a structure of a filter coated with a liquid layer when a substrate having a fiber or mesh structure is used.
Figure 8:
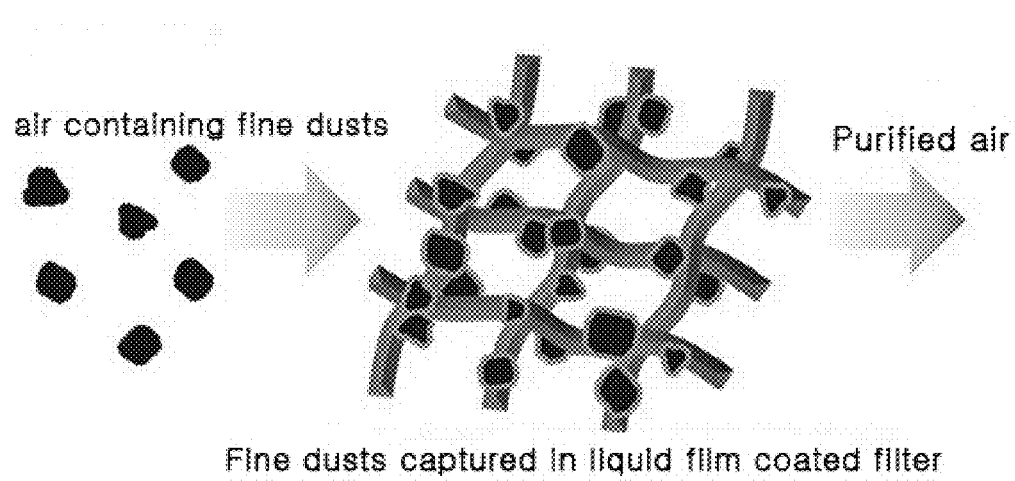
FIG. 8 shows an air purification process using a filter coated with a liquid layer on a substrate having a fiber or mesh structure.

FIG. 7 shows a structure of the filter coated with the liquid layer when the substrate has a fiber or mesh structure. FIG. 8 shows an air purification process using the filter coated with the liquid layer when the substrate has a fiber or mesh structure.

The liquid film coated filter implemented in accordance with the present disclosure captures PM particles in the air using strong adsorption (FIG. 7). In particular, since the liquid film does not flow under gravity and is present in a stationary phase as in a dry solid filter, the filter may be applied to various other fields and in various forms as the solid filter may be. Typical application examples thereof may include application thereof to filters for vacuum cleaners and air cleaners, large-capacity filters for air purification, PM particle collectors of factories and power plants, and insect screens for homes or buildings. The captured PM particles are simply removed in a self-cleaning manner by spraying water droplets on the filter in a spray jet manner, thereby allowing continuous long-term reuse of the filter coated with the liquid film.

According to a further embodiment of the present disclosure, a porous fiber or mesh may be used as the substrate. A plurality of such filters may overlap each other. The PM particle capturing and collecting filter device according to this further embodiment of the present disclosure is shown in FIG. 9.

Figure 9:
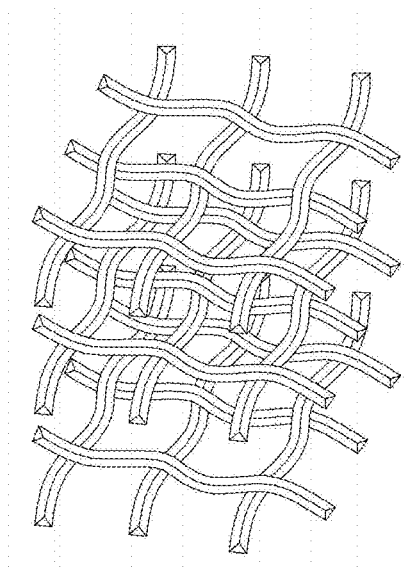
FIG. 9 shows overlapping of a plurality of PM particle capturing and collecting filter devices according to an additional embodiment of the present disclosure.

As shown in FIG. 9, in the PM particle capturing and collecting filter device according to the additional embodiment of the present disclosure, a fiber or a mesh is used as the substrate. A plurality of such fibers or meshes overlap with each other, thereby to capture PM particles more effectively.

In the PM particle capturing and collecting filter device according to the further embodiment, the substrate is preferably a porous substrate, for example, a fiber based substrate or a mesh based substrate. The surface modifying layer is made of preferably a material having a surface energy of 40 mN/m or lower. It is preferable that a material having a surface energy of 40 mN/m or lower is used for the liquid layer.

Further, the difference between the surface energy of the liquid layer and the surface energy of the surface modifying layer is preferably 10 mN/m or lower, preferably 5 mN/m or lower.

Figure 10:
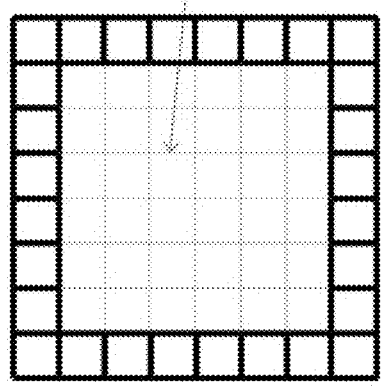
FIG. 10 shows an additional top view of a PM particle capturing and collecting filter device with a target-coated liquid film according to an additional embodiment of the present disclosure.

Further, in the further embodiment, when, the substrate is preferably a porous substrate, for example, a fiber based substrate or a mesh based substrate, the surrounding portion may be included to surround the outer perimeter of the liquid layer. FIG. 10 shows an additional top view of a PM particle capturing and collecting filter device with a target-coated liquid film according to an additional embodiment of the present disclosure.

In one example, the surrounding portion coated on the substrate to surround the liquid layer is made of a material having a lower surface energy than that of the liquid layer. It is preferable that a material having a surface energy of 20 mN/m or lower is used for the surrounding portion.

As shown in FIG. 10, the surrounding portion surrounds the liquid layer coated on a central portion of the substrate of the fiber or mesh structure. The surrounding portion does not surround a portion of the liquid layer on a portion of the substrate but surrounds an entire target region on which the liquid layer is coated. The surrounding portion is made of a material having a surface energy lower than that of the liquid layer on the fiber or mesh structure.

In the PM particle capturing and collecting filter device in the form of the fiber or the mesh according to the further embodiment of the present disclosure, a plurality of fibers or meshes overlap with each other, thereby to capture PM particles more effectively.

Descriptions of the presented embodiments are provided to enable any person skilled in the art of the present disclosure to use or implement the present disclosure. Various modifications to these embodiments will be apparent to those skilled in the art of the present disclosure. The general principles defined herein may be applied to other embodiments without departing from the scope of the present disclosure. Thus, the present disclosure should not be limited to the embodiments presented herein, but should be interpreted in the broadest scope consistent with the principles and novel features presented herein.

What is claimed is:

1. A particulate matter (PM) capturing and collecting filter device having a target-coated liquid film, the device comprising:
   a substrate;
   a surface modifying layer formed on the substrate;
   a liquid layer coated on the substrate through the surface modifying layer to form the target-coated liquid film; and
   a surrounding portion coated on the substrate to surround the liquid layer.

2. The device of claim 1, wherein the substrate is a porous substrate.

3. The device of claim 1, wherein the surface modifying layer is made of a material having a surface energy of 40 mN/m or lower.

4. The device of claim 1, wherein the liquid layer is made of a hydrophobic liquid material.

5. The device of claim 4, wherein the liquid material has a surface energy of 40 mN/m or lower.

6. The device of claim 1, wherein a difference between a surface energy of the liquid layer and a surface energy of the surface modifying layer is 10 mN/m or lower.

7. The device of claim 1, wherein a difference between a surface energy of the liquid layer and a surface energy of the surface modifying layer is 5 mN/m or lower.

8. The device of claim 4, wherein the surrounding portion is configured to prevent a spreading of the liquid material in the liquid layer across the substrate.

9. The device of claim 8, wherein the surrounding portion is made of a material having a surface energy lower than a surface energy of the liquid layer.

10. The device of claim 9, wherein the surrounding portion is made of a material having a surface energy of 20 mN/m or lower.

11. The device of claim 1, wherein the device further comprises a holder disposed to surround at least a portion of an outer periphery of the liquid layer.

12. The device of claim 11, wherein the holder or a coating thereon is made of a material having a surface energy lower than a surface energy of the liquid layer.

13. The device of claim 12, wherein the holder or the coating thereon is made of a material having a surface energy of 20 mN/m or lower.

14. The device of claim 11, wherein the holder has a tongs shape that contacts a bottom surface of the substrate and a top surface of the liquid film to support a combination of the substrate and the liquid layer coated on the substrate through the surface modifying layer.

15. The device of claim 1, wherein the substrate is a porous substrate having a fabric, a mesh, a non-woven fabric, or a metal mesh structure.

16. A particulate matter (PM) capturing and collecting filter device having a target-coated liquid film, the device comprising:
    a substrate;
    a surface modifying layer formed on the substrate; and
    a liquid layer coated on the substrate through the surface modifying layer to form the target-coated liquid film,
    wherein the substrate is a porous substrate having a fabric, a mesh, a non-woven fabric, or a metal mesh structure, and
    wherein the device includes a stack of combinations, each combination being composed of a respective substrate and a respective liquid layer coated on the respective substrate through a respective surface modifying layer.

17. The device of claim 16, wherein each combination further includes a surrounding portion coated on the respective substrate and surrounding the respective liquid layer.

18. A method for manufacturing a particulate matter (PM) capturing and collecting filter device with a target-coated liquid film, the method comprising:
    providing a substrate;
    forming a surface modifying layer on the substrate;

forming the target-coated liquid film by coating a liquid layer on the substrate through the surface modifying layer such that the surface modifying layer is impregnated with the liquid layer; and coating a surrounding portion on the substrate to surround the liquid layer.

\* \* \* \* \*